United States Patent [19]

Herndon, Jr.

[11] 4,154,588
[45] May 15, 1979

[54] CYLINDRICAL CELL SELF-CLEANING FILTER

[76] Inventor: Marion E. Herndon, Jr., P.O. Box 1976, Matthews, N.C. 28105

[21] Appl. No.: 837,228

[22] Filed: Sep. 27, 1977

[51] Int. Cl.$^2$ .......................................... B01D 46/04
[52] U.S. Cl. ...................... 55/283; 55/294; 55/350
[58] Field of Search ............... 55/272, 283, 294, 296, 55/297, 299, 302, 350, 528; 210/332, 413

[56] References Cited

U.S. PATENT DOCUMENTS

| | | | |
|---|---|---|---|
| 1,088,952 | 3/1914 | Wilkey | 55/350 |
| 3,303,635 | 2/1967 | Sherrill | 55/294 |
| 3,315,446 | 4/1967 | King, Jr. | 55/272 |
| 3,377,780 | 4/1968 | Noland | 55/294 |
| 3,472,002 | 10/1969 | Brown et al. | 55/272 |
| 3,667,195 | 6/1972 | Miner et al. | 55/294 |
| 3,757,496 | 9/1973 | Berg | 55/294 |
| 3,887,344 | 6/1975 | Smith | 55/296 |
| 3,938,970 | 2/1976 | Carter, Sr. | 55/276 |
| 3,977,847 | 8/1976 | Clark | 55/294 |

*Primary Examiner*—Bernard Nozick
*Assistant Examiner*—David L. Lacey
*Attorney, Agent, or Firm*—Richards, Shefte & Pinckney

[57] ABSTRACT

A stationary cylindrical drum type filter with self-cleaning capability and suitable for use as a cell or module in a bank of like filter units. A helically wound rod defines a cylindrical shape over which a foraminous web is supported in tubular configuration to form a filter element. A suction nozzle is disposed inside the filter element closely adjacent thereto and drive means causes the nozzle to rotate and traverse the filter element between and guided by the adjacent coils of the helix, and controls cause the spiral motion of the nozzle to reverse upon reaching each end of the filter element, and to start and stop in response to predetermined pressure drops through the filter. A plate closes off the filter element at one end of the helical support, and a mounting plate at the other end surrounds the inlet opening thereat and is square shaped with flanges at the side edges for abutment proximate like filter units to form a composite filter bank of any desirable shape and size, with all inlets in a common plane. The individual filter units may have a common suction source and common drive means including gears and removable sectional shaft elements to facilitate removal or addition of the filter units, or they may have individual drives and suction sources.

25 Claims, 10 Drawing Figures

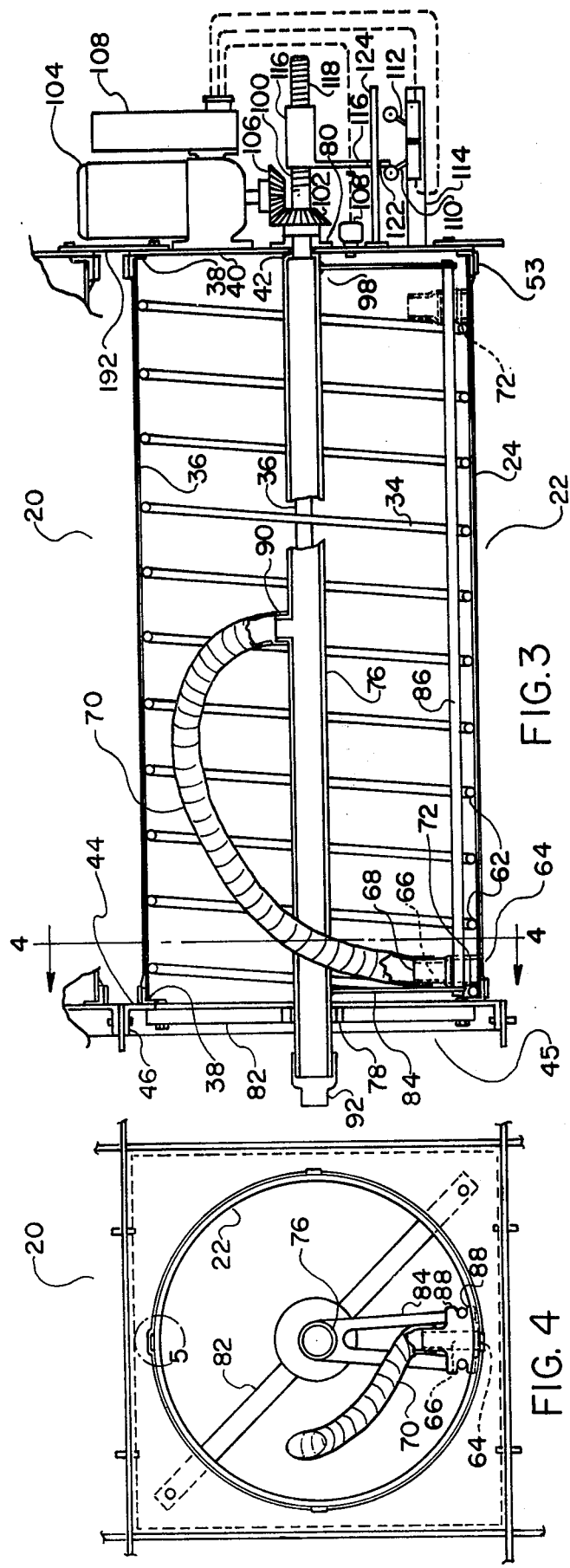
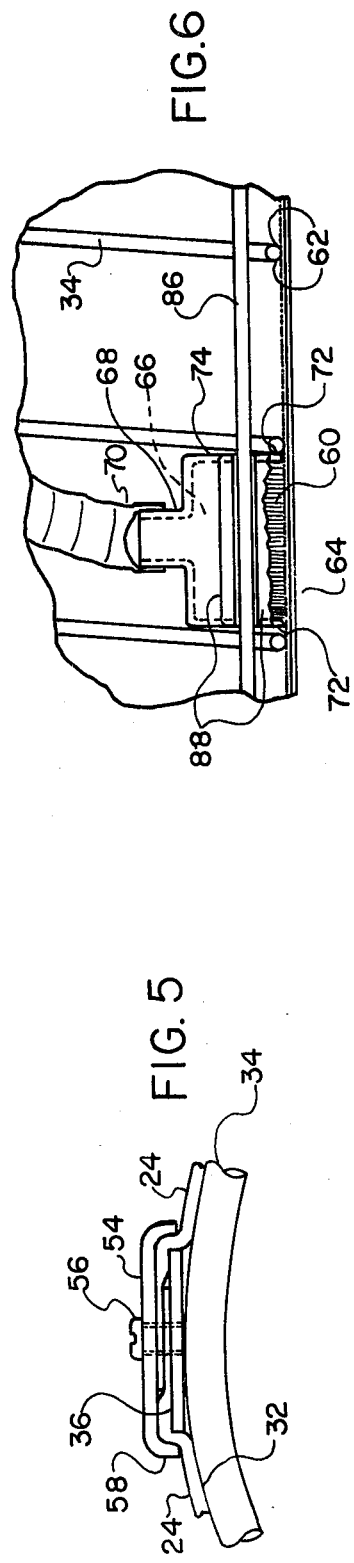

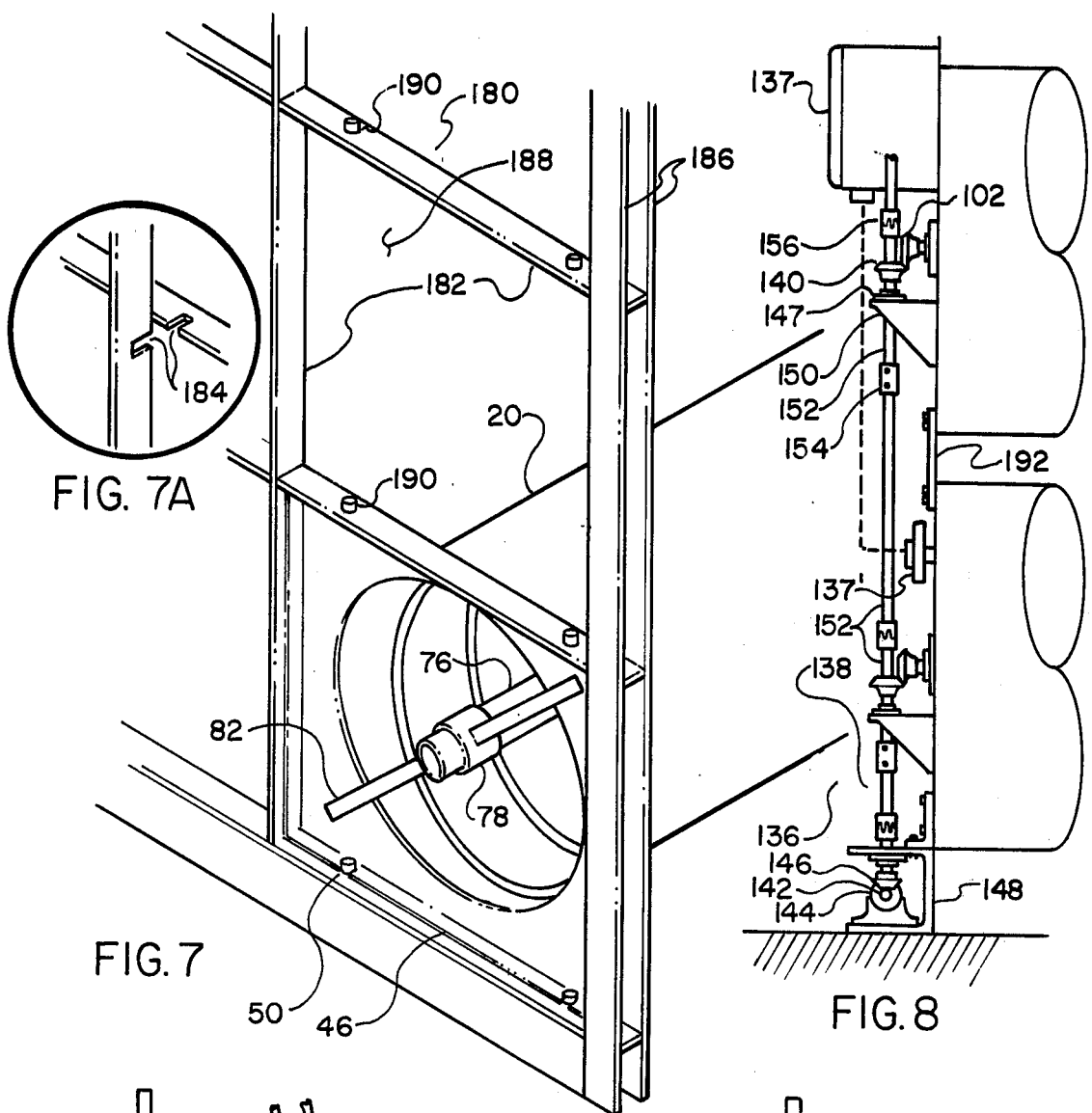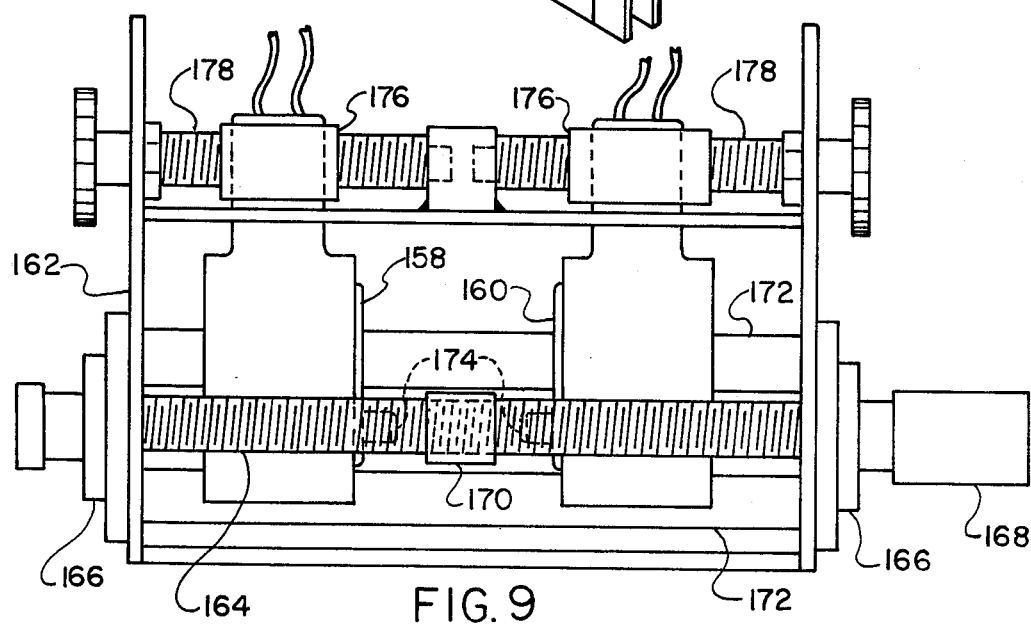

CYLINDRICAL CELL SELF-CLEANING FILTER

BACKGROUND OF THE INVENTION

Air filtration is a necessity in many industrial and commercial environments, not only for the health, comfort and safety of personnel, but also to prevent deposition of dust, lint, or other airborne material on heat exchanging elements of air conditioning equipment, on process equipment, or in or onto processed materials or products. Various types of self-cleaning filters are in use, principally (a) filter wall arrangements with traveling indexing suction cleaners; (b) filter walls comprised of filter paper strips stretched between rolls for automatic feeding of fresh paper as the porous paper loads up with dust, with the loaded paper being discarded; (c) rotating drum filters in which the dust is collected on the outside of the drum and is cleaned off by a suction nozzle traversing the length of the rotating drum; and (d) stationary drum filters which collect the dust on the drum and have rotating suction nozzles for covering the entire length of the drum at each rotation, as illustrated in U.S. Pat. No. 3,887,344.

Each of the above filtration systems has its own drawbacks, e.g.:

(a) the filter wall can only have the filtration area determined by the cross-sectional area of the duct or chamber within which it is installed; and while an indexing, traversing suction cleaning nozzle is mechanically practical, it is comparatively expensive and unwieldy;

(b) a filter wall comprised of throw-away paper strips has the same filter area limitations as the filter wall discussed above; constant paper replacement is expensive; and air flow tends to concentrate at the area of least resistance where fresh paper is fed in;

(c) rotating drum filters are unwieldy and require large amounts of floor space because of the large amount of open and wasted space inside the drum; and (d) stationary drum filters have the suction cleaning apparatus located inside the drum for rotation while the drum remains stationary, but the suction cleaning nozzles typically have a total length corresponding to the entire length of the drum thereby requiring a large amount of high suction air to meet the demands of the nozzles, and they also require large amounts of floor space.

The stationary cylindrical cell filter of the present invention effectively overcomes the aforesaid objections to the prior art filters by combining a stationary drum and rotating suction nozzle with a traversing nozzle in a simple apparatus; and by its suitability for forming a filter wall comprising a composite filter bank of reasonably sized filter units providing an equal filtration area in a much smaller floor space than that required by the prior art rotating and stationary filter drums discussed above and providing a significantly greater filtration area in only a little more floor space than required by the two prior art filter walls discussed above, while significantly cutting the volume of high suction air required for cleaning the filter and, at the same time, permitting the forming of a filter wall of any size and shape.

SUMMARY OF THE INVENTION

A cylindrical drum filter includes a helically wound support element; a foraminous filter element supported by the support element to provide the filter element with a tubular configuration; suction clean means engaging the support element for movement guided thereby and relative thereto, the suction clean means disposed adjacent the filter element; and means for moving the suction cleaning means relative to the support element whereby the suction cleaning means is caused to move along the surface of the filter element to clean it.

Briefly described, the filter element comprises a web releasably joined at two opposite edges thereof extending generally along the length of the helically wound support element; the support element includes a continuous bar member formed as a cylindrical helix on the outside of which the filter element is supported; the bar member is formed with guide surface means extending along the length thereof to define a helical guide path; and the cleaning means includes a suction nozzle disposed between adjacent coils of said bar member and formed with cooperating guide surface means for abutment with the bar member guide surface means.

Preferably, the filter element comprises a deep pile fabric; the means for moving the cleaning means includes drive means for causing rotary movement of the suction nozzle about the axis of the support element to cause the suction nozzle to move along the helical guide path defined by the bar member guide surface means; the drive means includes a control means for selectively reversing the direction of the rotary movement of the suction nozzle whereby the suction nozzle can be moved in either direction along the helical path, and further includes a rotatable shaft disposed along the axis of the support member, extension arms mounted on the shaft to extend radially therefrom for rotation therewith, and slide means mounted on the extension arms at the extending ends thereof parallel to the axis for slidable support and guidance of the suction nozzle.

In the preferred embodiment of this invention, the rotatable shaft is hollow, flexible tubing extends between the hollow shaft and the suction nozzle to provide communication therebetween, and one end of the hollow shaft is connected to a vacuum source. The suction nozzle extends axially relative to the helical support element across substantially the entire spacing between adjacent coils thereof and includes spaced side guide surfaces for abutment with cooperating bar member guide surface means comprising guide surfaces formed by the facing sides of the adjacent coils. In an alternative preferred embodiment the suction nozzle extends axially relative to the helical support element and has an axial extent substantially one half that of the spacing between adjacent coils of the bar member for cleaning one half of the filter element during rotary movement of the suction nozzle in one direction and for cleaning the other half of the filter element during rotary movement of the nozzle in the other direction. The means for moving the suction clean means is selectively operable and includes a pressure sensitive control means for selectively causing the operation of the means for moving in response to a predetermined pressure drop across the filter element.

A composite filter bank includes a plurality of modular filter units, each modular filter unit being of identical construction and being selectively connected to other modular filter units to form the filter bank, the modular filter units each including a filter element and suction means selectively movable within the modular filter unit to clean the filter element associated therewith;

each filter element has a tubular configuration with one end thereof being closed by an end plate and the other end thereof being open to form an inlet thereto and to the filter unit, and all of the filter element inlets are located in a common plane; and a common drive means is provided for operating the movable suction means of all of the filter units.

Briefly described, each of the modular filter units includes a mounting plate formed at the filter unit inlet with a plurality of abutment surfaces having uniform configuration; each modular filter unit is arranged with at least one abutment surface thereof contiguous with a corresponding abutment surface of an adjacent modular filter unit; a common drive means is provided for operating the movable suction means of all of the filter units, each movable suction means having a driven gear connected thereto, by a plurality of first drive shaft means each of which includes driving gears for engaging and driving the driven gears and by at least one second drive shaft means operatively connected for driving the first drive shaft means; and each modular filter unit includes a cylindrical filter unit, with respect to which the suction means moves axially while rotating therein, and a control means is provided for selectively reversing the common drive means for reversing the movement of the suction means with respect to the axis of the filter element.

Preferably, the abutment surfaces comprise mounting plates having flanges at the side edges thereof contiguous with corresponding flanges of adjacent filter units, and the end plates of the adjacent filter units have at least one connection plate extending therebetween for connection thereof; each filter unit includes a helically wound support element, a foraminous web supported by the support element in tubular configuration and comprising the filter element, the suction cleaning means engages the support element for guided movement relative thereto, the suction cleaning means is disposed adjacent the filter element, and means is provided for moving the suction cleaning means relative to the support element whereby the suction cleaning means is caused to move along the surface of the filter element to clean it; and at least some of the first and second drive shaft means include a plurality of coupled shaft sections selectively removable from one another for facilitating removing and adding individual filter units.

In the preferred embodiment of this filter bank, the drive means is selectively operable and includes a pressure sensitive control means for operating the drive means selectively in response to a predetermined pressure drop across the filter bank; each movable suction means has a driven gear connected thereto and driven by drive shaft means including driving gears mounted thereon for engaging and driving a plurality of the driven gears; the drive shaft means include a plurality of coupled shaft sections selectively removable from one another for facilitating removing and adding individual filter units; and a common source of suction is connected to the suction cleaning means of all of the filter units.

BRIEF DESCRIPTION OF THE DRAWINGS

FIG. 3 is an enlarged vertical cross-sectional side view of the filter unit of FIG. 1 with an individual drive apparatus connected thereto;

FIG. 4 is a lateral cross-sectional view taken along line 4—4 in FIG. 3;

FIG. 5 is an enlarged detail illustrating a clamping arrangement for the filter element;

FIG. 6 is an enlarged detail view showing an alternative suction nozzle used in the filter unit of the present invention;

FIG. 7 is an enlarged perspective view showing details of the lower right hand portion of the filter bank of FIG. 1;

FIG. 7A is an exploded detail view illustrating a joint of the frame for the filter bank shown in FIG. 7;

FIG. 8 is a partial elevational view as seen from the left side of the filter bank of FIG. 1 along the rear side of the filter bank showing details of the common drive for the plurality of filter units; and FIG. 9 is a front view of the reversing switch apparatus for the common drive shown in FIG. 8.

DESCRIPTION OF THE PREFERRED EMBODIMENT

The preferred embodiment of the present invention comprises a stationary filter drum of comparatively small size and a suction cleaning nozzle which travels along a helical path therethrough to clean a first narrow strip forming half the filter area when traveling in one direction, and a second narrow strip forming the other half of the area when traveling in the reverse direction. A plurality of individual filter units may be stacked to form filter walls which, when compared to conventional filter walls and drum filters, provide a larger filter area for a given wall space and floor space occupied by the filter walls and drum filters respectively.

Figure 2:
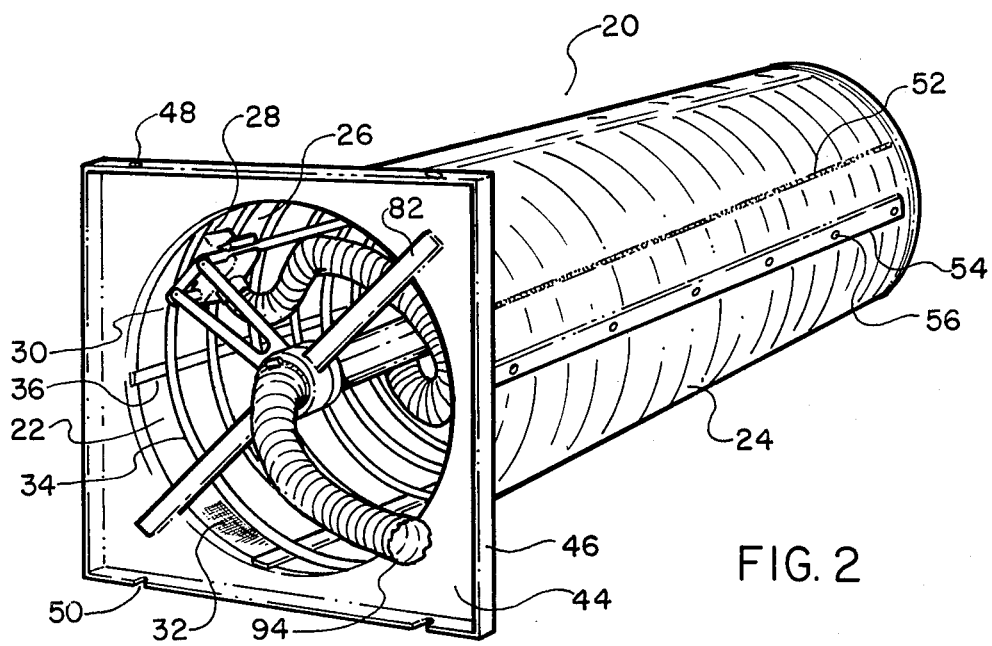
FIG. 2 is an enlarged perspective view of the cylindrical drum filter unit shown in FIG. 1.

A single cylindrical drum filter unit 20 is shown in FIG. 2 and comprises a cylindrically helically wound support element 22 covered by a foraminous web filter element 24 disposed in a tubular configuration over the outside of the support element 22, a suction cleaning device 26 including a suction nozzle 28 engaging the support element 22 for movement guided thereby and relative thereto, the suction nozzle 28 being disposed adjacent the filter element 24, and a carriage 30 for moving the cleaning device 26 relative to the support element 22 whereby the cleaning device 26 is caused to move along the inner surface 32 of the filter element 24 to clean it.

The support element 22 is formed by a continuous steel bar or rod member 34 having a circular cross-section as shown in FIGS. 3 and 6, and is made self-supporting and rigid in its helically wound form by the four steel strips 36 which extend axially along its circumference at 90° intervals thereabout and which are welded to each coil of the bar member 34 at each point of intersection therewith. At each end of the support element 22 a circular steel ring or hoop 38 of L-shaped cross-section encircles and is welded to the end of the bar member and the respective ends of the strips 36 to complete the cylindrical form of the support element 22.

A circular end plate 40 having a small hole 42 centrally located therein is welded to the ring 38 at one end of the support element 22 to form a closed end, and a square end plate 44 having a circular opening therein is welded in concentric relation to the ring 38 at the other end of the support element 22 to form an inlet end 45 thereof, with the circular opening being of substantially the same size as the inner diameter of the ring 38. The plate 44 has a flange 46 at each side edge thereof forming an abutment surface and extending outwardly and perpendicularly with respect to the support element 22. The upper one of the flanges 46 has a pair of holes 48 therein, and the lower one of the flanges 44 has a pair of slots 50 therein which are open-ended at the extending edge of the lower one of the flanges 46, for mounting purposes to be explained hereinafter.

A rectangular sheet of a suitable fabric filter medium is stretched over and around the support element 22 to form the filter element 24 as shown in FIG. 2 and may be releasably joined at two opposite side edges of the sheet by a zipper connection 52 extending generally along the length of the support element 22 for ease of installation and removal. A clamping band 53 encircles each ring 38 over the filter element 24 and is tightened to secure the filter element 24 thereon. At each steel strip 36 on the support element 22, a channel-shaped clip 54 extends therealong and is fastened over the filter element 24 by the screws 56 extending into threaded holes provided in the strips 36, as shown in FIG. 5. The flanges 58 of the clips 54 hold the filter element 24 close in to the side edges of the clips 54 and close down on the rod member 34 to form a more nearly cylindrical inner surface 32 of the filter element 24 and to draw the filter element 24 tight about the support element 22. Alternatively, the zipper connection 52 may be eliminated and the opposite side edges of the sheet of filter medium forming the filter-element 24 may be lapped on each other under one of the clips 54 to releasably join them, as shown in FIG. 5. Although various types of filter media could be used for the filter element 24, the preferred embodiment of the present invention utilizes a deep pile fabric which provides excellent filtering results. As shown in FIG. 6, the fibers 60 of this fabric will extend perpendicularly from the base of the filter element 24 while under the influence of suction currents during cleaning thereof, and the fibers 60 will lie flat against the base of the filter element 24 while under the influence of dust laden air passing through the filter element 24 from the interior thereof to the outside thereof during filtering.

The side surfaces 62 of the bar member 34 form guide surfaces extending along the spiral or helical length thereof and define a helical guide path for the suction nozzle 28. The nozzle 28 has a suction mouth or opening 64 at one end thereof, a suction passage 66 extending therethrough from the mouth 64, and an attachment extension 68 at the other end thereof where a length of flexible hose 70 is attached, all as shown in FIGS. 3 and 4. The nozzle mouth 64 is disposed in close proximity to the inner surface 32 of the filter element 24 between the adjacent coils of the helical support element 22 and extends axially relative to the support element 22, to cover about half the lengthwise space between a pair of the adjacent coils. The side surfaces 72 of the nozzle 28 adjacent the filter element 24 are formed as cooperating guide surface means for abutment with the bar member side surfaces 62 and may be angled to correspond with the helical angle of the bar member 24.

An alternate nozzle arrangement is shown in somewhat enlarged partial cross-section in FIG. 6 and comprises a wider suction nozzle 74 extending axially with respect to the support element 22 to cover substantially the entire space between a pair of the adjacent coils thereof, and may be used, when desired, in place of the smaller suction nozzle 28 described above, though a greater volume of suction air flow will be required for the larger nozzle 74 than for the smaller nozzle 28.

The carriage 30 for moving the cleaning means 26 includes a hollow shaft or tube 76 disposed along the axis of the support element 22 and journaled for rotation in a bearing 80 mounted on the end plate 40 at the closed end of the support element 22, and in a bearing 78 having support bar 82 extending therefrom for attachment to the square end plate 44. Extension arms 84 extend radially from the shaft 76 for rotation therewith just inside the end plates 40 and 44, respectively, and carry at their extending ends a pair of slide rods 86 disposed in spaced parallel relation to each other and in parallel equispaced relation to the shaft 76 adjacent the inner circumference of the support element 22. The alternative suction nozzles 28 and 74 both have parallel spaced-apart guide ears 88 formed on each side thereof which extend longitudinally with respect to the support element 22 and engage the slide rods 86 for sliding support thereon and guidance thereby.

Figure 1:
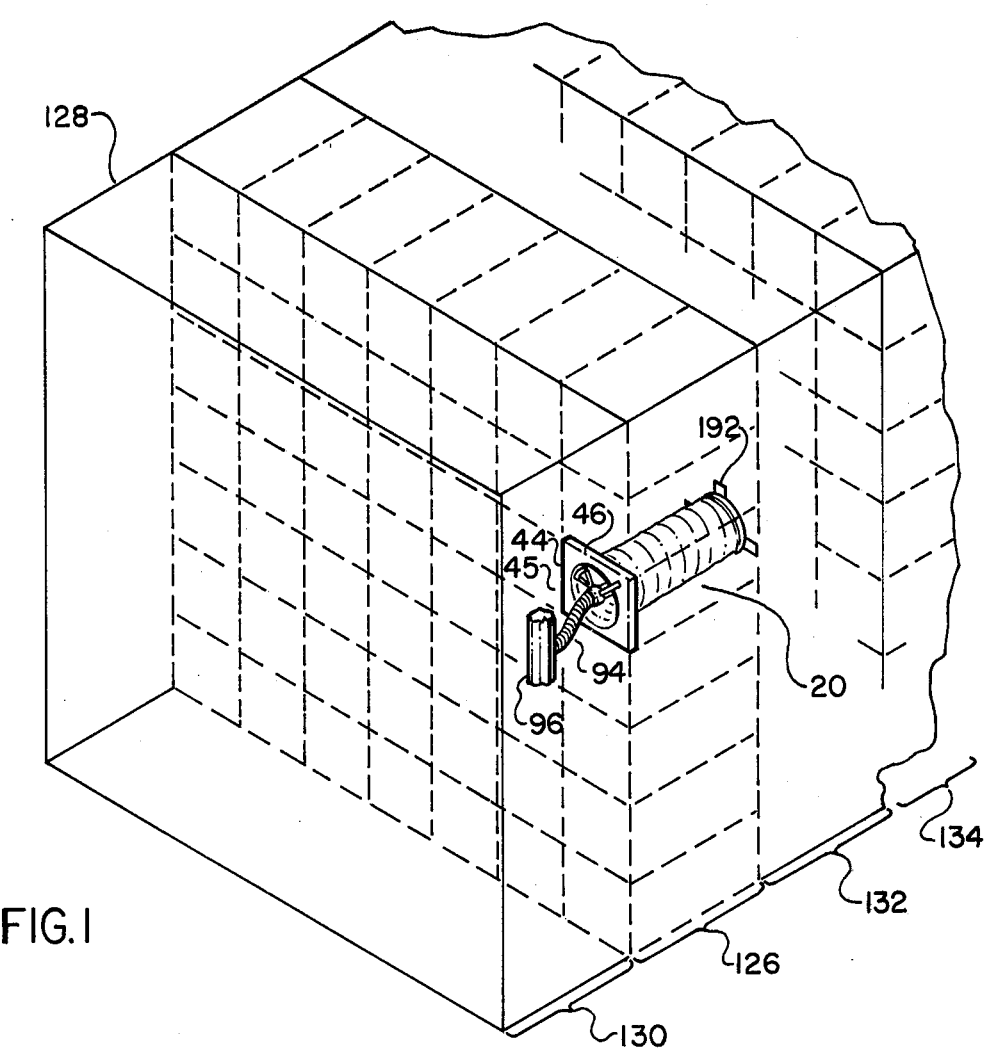
FIG. 1 is a diagrammatic illustration of a bank of cylindrical drum filter units, with one such filter unit being shown in full lines and the remaining filter units being represented as blocks in dotted lines.

As shown in FIG. 3, the hollow shaft 76 has a lateral nipple 90 in the side thereof about midway of the length of the support element 22, and the length of flexible hose 70 is connected thereto to maintain suction communication between the shaft 76 and the nozzle 28 at all positions of the nozzle 28 within the filter element 24. The end of the hollow shaft 76 at the inlet end 45 extends through the bearing 78 for attachment, by a conventional rotary joint 92, to one end of a second length of flexible hose 94. The other end of the hose 94 may typically be connected as shown in FIG. 1 to a suction header 96 which is in turn connected to any convenient common source of suction (not shown).

The drive end 98 of the shaft 76 has a solid extension 100 which is journalled in the bearing 80 and extends therethrough and has a driven miter or bevel gear 102 attached thereto. Where it is desirable to have an individual drive for a single filter unit 20, a gearmotor 104 having a second miter or bevel gear 106 attached to the shaft thereof may be mounted on the end plate 40 for driving engagement of the gears 102 and 106.

To automatically and selectively reverse the direction of rotation of the shaft 76, and thereby reverse the direction of axial movement of the nozzle 28 within the support element 22, a control panel 108 is associated with the gearmotor 104 and is operative to reverse the direction of rotation of the shaft 76 in response to the actuation of a pair of limit switches 110 and 112. The limit switches 110 and 112 are adjustably mounted on a bracket 114 extending from the end plate 40 for engagement by a projection 120 fixed to a nut 116 threadably carried on the threaded portion 118 of the shaft extension. A guide finger 124 extends from the end plate 40 and through a guide aperture 122 formed in the projection 120 to prevent rotation of the nut 116 while permitting it to travel axially of the shaft 76 during rotation thereof. Thus, as the shaft 76 rotates in one direction, the nut 116 and its projection 120 are caused to move axially along the shaft 76 until the projection engages and actuates one of the limit switches 110 of 112 whereby the control panel 108 causes the gearmotor 104 to reverse the direction of rotation of the shaft 76 so that the nut 116 and its projection 120 are caused to move in the opposite direction along shaft 76 until the other limit switch is engaged and actuated to again reverse the direction of rotation of the shaft 76. More-over, since the limit switches 110 and 112 are adjustably mounted on the bracket 114, they may be set at any desired position to reverse the direction of rotation of the shaft after a predetermined number of revolutions thereof.

A conventional pressure switch 108' is diagrammatically shown in FIG. 3 and is connected to the control panel 108 for monitoring the pressure drop across the filter element 24 and selectively energizing the gearmotor 104 in response to an increased pressure drop across the filter element 24 as it becomes loaded with material filtered from air passing therethrough.

In operation, when air containing contaminant material passes through the inlet end 45 of the support 22 and through the filter element 24, the contaminant material is deposited on the inner surface 32 of the filter element 24, and rotation of the shaft 76 by the gearmotor 104 causes the nozzle 28 to rotate with the slide rods 86. As shown in FIG. 3, rotation of shaft 76 in the clockwise direction will cause the nozzle 28 to move to the right on the slide rods 86 in guiding engagement with the right hand side surface 62 of the bar member 34. Continued rotation of the nozzle 28 about the axis of the support element 22 will cause it to follow a helical path along the right hand side surface 62 of the bar member 24 to an appropriate position indicated in broken lines by the numeral 28'. Such rotation of the shaft 76 causes the nut 116 to move to the right so that the projection 120 engages and actuates the limit switch 112, thereby causing the shaft 76 to reverse its direction of rotation. The nozzle 28 then rotates for a part of a revolution in the counterclockwise direction of shaft 76 without touching the bar member 34, but then comes into engagement with the left hand side surface 62 thereof and travels in a reverse helical path sliding leftward on the rods 86 with the left hand side surface 62 of the bar member 34 contacting the right hand side surface 72 of the nozzle 28. Continued rotation thereof brings the nozzle 28 back to a position approximating that indicated by the numeral 28 in FIG. 3, where the nut 116 will engage the limit switch 110 to again reverse the rotation of the shaft 76 unless stopped sooner by the action of the pressure switch 108' described hereinbefore indicating that the filter element 24 is sufficiently clean. It is to be noted that since the suction nozzle 28 has an axle length approximately one-half of the axial spacing between adjacent coils of the bar member 34 as described above, the movement of the nozzle 28 in one axial direction cleans only one half of the filter element 24, and the other half of the filter element 24 is cleaned during the movement of the nozzle 28 in the reverse direction. On the other hand, if the larger nozzle 74 (FIG. 6) is used in lieu of the smaller nozzle 28, then the entire filter element 24 is cleaned during each pass of the nozzle 74 along the axial length of the filter element 24.

It is to be understood that the gearmotor 104 may be chosen to have a ratio which will allow the nozzle 28 to travel constantly thereby cleaning the filter element 24 constantly, or it may be chosen to cause the nozzle 28 to travel more quickly but only intermittently, under the control of the pressure switch 108'.

A single filter unit 20 with a gearmotor 104 driving it may be effectively used to control dust within some individual piece of equipment, such as a textile draw frame or card, or a plurality of filter units 20 may be used effectively to form the modules of a composite filter bank or filter wall 126 as shown in FIG. 1, where a single cylindrical drum filter unit 20 is shown in detail with forty-eight other similar filter units 20' arranged therewith as indicated by the broken line boxes in FIG. 1, with all their inlet ends 45 as formed by the end plates 44 arranged in a common plane. The solid lines surrounding the filter wall 126 indicate a passage or duct 128 through which contaminated air is passing from left to right through an entrance plenum 130 into the filter bank 126 and thence through an exit plenum 132. FIG. 1 illustrates a second filter bank 134 beyond the first filter bank 126 which can be used where additional filtration is desirable. In such a case, the filter elements 24 of the filter bank 126 may be coarser than those of the second filter bank 134, as is customary with multi-stage filtration. In a filter bank 126, the flexible hoses 94 from each filter unit 20 are connected to one or more common headers 96 which are in turn connected to a common source of suction.

In a filter bank 126 or 134, a common drive means 136 may be provided as shown in FIG. 8 for driving all the driven bevel gears 102 mounted on the shafts 76 to drive all the suction cleaning devices 26 in unison. A first drive shaft 138 has multiple bevel drive gears 140 mounted thereon for engaging and driving the bevel gears 102 connected to the movable suction nozzles 28 in each vertical column of filter units 20, and a second drive shaft 142 is disposed to run across the entire width of the filter bank 126 or 134 therebeneath and is driven by a gearmotor (not shown). The shaft 142 has one or more bevel drive gears 144 thereon disposed for operative connection to each shaft 138 for driving thereof by engagement with a driven bevel gear 146 attached to the lower end of each shaft 138. The shaft 138 is journalled in bearings 147 which may be suitably supported by the channel 148 and the alignment brackets 150 mounted on the end plates 40 of the filter units 20. Each shaft 138 may comprise a number of coupled shaft sections 152 of various lengths, suitably coupled by conventional sleeve couplings 154 and self-aligning couplings 156, so that the coupled sections 152 may be removed selectively from one another as desired to facilitate the removal or addition of individual filter units 20 from a filter bank 126 or 134 for maintenance or other purpose. A longer coupled shaft section (not shown) may be substituted for the removed shaft sections 152 so that the remaining filter units 20 may continue to be driven in the absence of a filter unit 20 and its associated bearing 146, and the open space left by the removal of an individual filter unit would preferably be closed by any suitable device (not shown) to prevent the passage of contaminated air through such open space.

Reversing limit switches 158 and 160 are provided for the common drive means 136 and are mounted on a framework 162 as shown in FIG. 9 for disposition within the channel 148. A threaded shaft 164 journalled in a bearing 166 mounted on the framework 162 has a coupling 168 at one end thereof extending beyond the framework 162 for driven connection to the second drive shaft 142. A nut 170 threaded on the shaft 164 has an extended end disposed between guide bars 172, which form part of the framework 162 for extension between the plungers 174 of the limit switches 158 and 160. Rotation of the shaft 164 causes the nut 170 to travel axially thereof until one of the switches 158 and 160 is actuated, and that actuation causes reversal of the gearmotor (not shown) connected to the drive means 136 through a control panel 137 associated with the gearmotor. Reverse operation drives the nut 170 in the other direction to actuate the other of the switches 158 and 160 for reversal again to the original direction, all in a manner similar to the operation described above in connection with limit switches 110 and 112. The switches 158 and 160 are mounted in collared nuts 176 carried on the screws 178 journalled in the framework 162 for individual adjustment relative to the extended nut 170, whereby the direction of rotation of the shafts 76 in the filter units 20 will be reversed after a predetermined number of revolutions. Just as in the individually driven filter unit hereinbefore described, the common drive means 136 may have a conventional pressure switch 137' for monitoring the pressure drop across the filter bank and selectively causing the gearmotor to be energized for cleaning the filter units only when they are suitably loaded with dust.

For ease of mounting the individual filter units 20 in the filter bank 126, an eggcrate framework 180 is provided as shown in FIGS. 7 and 7A, wherein cross slats 182 are formed by flat steel bars having notches 184 spaced therealong for interlocking at right angles, with the ends of the horizontal slats 182 being retained between parallel flat bars 186. At each eggcrate compartment 188, two pins 190 extend through each of the upper and lower slats 182 to provide a ready means for hanging the individual filter units 20 in the compartment 188, and for removing them therefrom. By tilting the closed end of a filter unit 20 upward, the holes 48 in the upper flange 46 of its square end plate 44 may be engaged with the downwardly projecting ends of the pins 190 of the upper slat 182 of a compartment 188, after which the closed end of the unit 20 may be lowered to engage the slots in the lower flange 46 of the end plate 44 with the upwardly projecting pins 190 of the lower slat 182 of the compartment 188. The weight of the unit 20 then holds it in place with its flanges 46 contiguous with the flanges 46 of adjacent units 20, and tie plates 192 as shown in FIGS. 3 and 8 are bolted to the end plates 40 at the closed ends of adjacent filter units 20 to provide rigidity in the filter bank 126. Sealing strips (not shown) may be provided, if desired, along the portions of the slats 182 not covered by the flanges 46 for sealing engagement with the extending edges of the flanges 46. Alternatively, holes (not shown) may be provided in all the flanges 46 of the plates 44 so that adjacent units 20 may be bolted directly together with the flanges 46 in touching contiguity, whereby the eggcrate frame 180 would not be necessary.

The details of the preferred embodiment described herein are for disclosure purposes only and are not intended to represent the only apparatus for cylindrical drum filters within the scope of this invention, which scope is to be determined only by the claims appended hereto.

I claim:

1. A cylindrical drum filter unit comprising:
   (a) a helically wound support element;
   (b) a foraminous filter element supported interiorly by said support element to provide said filter element with a tubular configuration;
   (c) suction cleaning means engaging said support element for movement guided thereby and relative thereto such that said cleaning means moves in a helical path defined by said support element, said suction cleaning means being disposed adjacent said filter element; and
   (d) means for moving said suction cleaning means relative to said support element whereby said suction cleaning means is caused to move along the surface of said filter element to clean the same.

2. A cylindrical drum filter unit according to claim 1 wherein said filter element comprises a web releasably joined at two opposite edges thereof extending generally along the length of said helically wound support element.

3. A cylindrical drum filter unit according to claim 1 wherein said filter element comprises a deep pile fabric.

4. A cylindrical drum filter unit according to claim 1 wherein said support element comprises a continuous bar member in the shape of a cylindrical helix and said filter element is supported on the outside thereof.

5. A cylindrical drum filter unit according to claim 4 wherein said bar member includes guide surface means extending along the length of said bar member to define a helical guide path.

6. A cylindrical drum filter unit according to claim 5 wherein said cleaning means includes a suction nozzle disposed between adjacent coils of said helical bar member, said suction nozzle including cooperating means for abutment with said bar member guide surface means.

7. A cylindrical drum filter unit according to claim 6 wherein said means for moving said cleaning means includes drive means for causing rotary movement of said suction nozzle about the axis of said support element to cause said suction nozzle to move along said helical guide path defined by said bar member guide surface means.

8. A cylindrical drum filter unit according to claim 7 wherein said drive means includes a first control means for selectively reversing the direction of said rotary movement of said suction nozzle whereby said suction nozzle can be moved in either direction along said helical path defined by said bar member.

9. A cylindrical drum filter unit according to claim 8 wherein said drive means includes a rotatable shaft disposed along the axis of said support member, extension arms mounted on said shaft to extend radially therefrom for rotation therewith, and slide means mounted on said extension arms at the extending ends thereof parallel to said axis for slidable support and guidance of said suction nozzle.

10. A cylindrical drum filter unit according to claim 9 wherein said shaft is hollow, and a length of flexible hose is connected between said hollow shaft and said suction nozzle to provide communication therebetween, and a vacuum source is connected to one end of said hollow shaft.

11. A cylindrical drum filter unit according to claim 10 wherein said suction nozzle extends axially relative to said helical-shaped support element across substantially the entire spacing between adjacent coils thereof and said suction nozzle cooperating means includes spaced side contact surfaces for said abutment with said bar member guide surface means.

12. A cylindrical drum filter unit according to claim 10 wherein said suction nozzle extends axially relative to said helical support element and has an axial extent substantially one half that of the spacing between adjacent coils of said bar member for cleaning one half of said filter element during said rotary movement of said suction nozzle in one direction and for cleaning the other half of said filter element during said rotary movement of said suction nozzle in the other direction.

13. A cylindrical drum filter unit according to claim 1 wherein said means for moving said suction cleaning means is selectively operable and includes a pressure sensitive control means for selectively causing the operation of said means for moving in response to a predetermined pressure drop across said filter element.

14. A composite filter bank including a plurality of modular filter units, each said modular filter unit being of identical construction and being selectively connected to at least one other modular filter unit to form said filter bank, said modular filter units each including:
 (a) a filter element;
 (b) suction means selectively movable within said filter element for cleaning thereof;
 (c) a helically wound support element;
 (d) said filter element being interiorly supported by said support element in tubular configuration;
 (e) said suction cleaning means engaging said support element for guided movement relative such that said cleaning means moves in a helical path defined by said support element thereto, said suction cleaning means being disposed adjacent said filter element; and
 (f) means for moving said suction cleaning means relative to said support element whereby said suction cleaning means is caused to move along the surface of said filter element to clean the same.

15. A composite filter bank according to claim 14 wherein each said filter element has a tubular configuration with one end thereof being closed by an end plate and with the other end thereof being open to form an inlet thereto and to said filter unit, and in that all of said filter element inlets are located in a common plane.

16. A composite filter bank according to claim 15 wherein each of said modular filter units includes a mounting plate formed at said filter unit inlet end with a plurality of abutment surfaces having a uniform configuration, each said modular filter unit being arranged with at least one said abutment surface thereof contiguous with a corresponding abutment surface of an adjacent modular filter unit.

17. A composite filter bank according to claim 16 wherein said abutment surfaces comprise mounting plates having flanges at the side edges thereof contiguous with corresponding flanges of adjacent filter units and in that said end plates of said adjacent filter units have at least one connection plate extending therebetween for connection thereof.

18. A composite filter bank according to claim 14 wherein a common drive means is positioned and arranged for operating said movable suction means of all of said filter units.

19. A composite filter bank according to claim 18 wherein said drive means is selectively operable, and includes a pressure sensitive control means for operating said drive means selectively in response to a predetermined pressure drop across said filter bank.

20. A composite filter bank according to claim 18 wherein each said movable suction means has a driven gear connected thereto, and drive shaft means including driving gears mounted thereon are provided engaging and driving a plurality of said driven gears.

21. A composite filter bank according to claim 20 wherein said drive shaft means includes a plurality of coupled shaft sections selectively removable from one another for facilitating removing and adding individual filter units.

22. A composite filter bank according to claim 14 wherein a common drive means is positioned and arranged for operating said movable suction means of all of said filter units, each said movable suction means has a driven gear connected thereto, said common drive means includes a plurality of first drive shaft means each of which includes driving gears for engaging and driving a plurality of said driven gears, and at least one second drive shaft means is operatively connected for driving said first drive shaft means.

23. A composite filter bank according to claim 22 wherein at least some of said first and second drive shaft means include a plurality of coupled shaft sections selectively removable from one another for facilitating removing and adding individual filter units.

24. A composite filter bank according to claim 13 wherein a common source of suction is connected to said suction cleaning means of all of said filter units.

25. A composite filter bank according to claim 18 wherein said suction means moves axially with respect to said filter element while rotating therein, and a control means is provided for selectively reversing said common drive means for reversing the movement of said suction means with respect to the axis of said filter element.

* * * * *